Patented Oct. 28, 1930

1,779,984

UNITED STATES PATENT OFFICE

JOHANN PAUL SCHMITTNÄGEL, OF BASEL, SWITZERLAND, ASSIGNOR TO NATIONAL ANILINE & CHEMICAL COMPANY, INC., OF NEW YORK, N. Y., A CORPORATION OF NEW YORK

PROCESS OF MAKING CYANOGEN CHLORIDES

No Drawing. Application filed January 25, 1927. Serial No. 163,565.

This invention relates to improvements in the production of cyanogen chloride, and particularly to the production of cyanogen chloride in the presence of an inert solvent.

It is well known that chlorine does not act, or acts very slowly, upon sodium cyanide under perfectly anhydrous conditions, but that in the presence of a small quantity of water the reaction readily takes place and under suitable conditions of temperature and pressure cyanogen chloride is the chief product of the reaction.

It has been heretofore proposed to prepare cyanogen chloride by the action of moist chlorine upon sodium cyanide in the presence of carbon tetrachloride and of about two percent of water at a temperature of about 0° to +5° C., and subsequently removing the cyanogen chloride by distillation of the mixture thus produced.

According to the present invention cyanogen chloride is produced by treating an alkali metal cyanide, such as sodium cyanide, with chlorine in the presence of carbon tetrachloride, or other similar inert organic solvent or diluent, which contains a small amount of an organic catalyst, such as ethyl alcohol, to promote the reaction. During the reaction of chlorine on the cyanide, the solution is vigorously agitated and well cooled, and preferably, the cyanide is in a finely pulverized condition. For the best results, the reagents and solvents employed in the reaction are preferably dry and practically free from water. During the introduction of chlorine into the solvent containing the cyanide, the temperature is maintained below the boiling point of cyanogen chloride, and preferably around or below 0° C. Approximately, the theoretical amount of chlorine required to act with the cyanide is employed, and the introduction of an excess of chlorine should be avoided. The following example will further illustrate the invention, but it will be understood that the invention is not limited thereto. The parts are by weight.

*Example.*—In a vessel equipped with a reflux condenser, an agitator, and heating and cooling means, 50 parts of finely ground and dry sodium cyanide (96 to 98% purity) are suspended in about 300 parts of dry carbon tetrachloride, containing about 0.5 parts of ethyl alcohol (95% strength). The mixture is cooled to about +5° to −10° C., and then treated with a current of dry chlorine, the temperature of the reaction mixture being maintained around +5 to −10° C., preferably not above about 0° C. About 70 parts of chlorine, or substantially the theoretical quantity to react with the sodium cyanide, are added. After all of the chlorine has been added, the mixture is stirred for an additional half hour or so, or until the reaction is complete. Excess of chlorine is to be avoided.

In the above example, cyanogen chloride and sodium chloride are produced in the reaction, and the former dissolves in the carbon tetrachloride while the latter separates as an insoluble precipitate. From the mixture thus obtained, the cyanogen chloride can be removed, if desired, by careful distillation, or the solution as such may be employed as a reagent in the preparation of other compounds wherein cyanogen chloride is used, and particularly where the presence of water is undesirable, such as, for example, treatment with aniline for the production of cyananilide (phenyl cyanamide), or with other amines for the production of analogous aryl cyanamides. The solution may also be used, under suitable conditions, for the preparation of diaryl guanidines.

It will be readily understood that the invention is adapted to the preparation of cyanogen chloride solutions in other suitable solvents, preferably solvents immiscible in water, which are inert or substantially so, toward the action of chlorine, but in which cyanogen chloride is more or less readily soluble. In particular, certain halogen derivatives of the aliphatic series, such as ethylene dichloride, trichlor ethylene, tetrachlor ethane, etc. are useful. The use of dry inert solvents having a boiling point between about 60° and 110°, and especially between about 75° C. and 100° C. is preferred.

It will be further understood that the invention is adapted to the use of other organic catalysts than ethyl alcohol, the amount of alcohol employed being ordinarily about ½ to 3%, or better, about 1 to 1½% of the weight of the cyanide employed.

It will be further understood that the invention is applicable to the use of bromine in place of chlorine, and to the use of other metal cyanides, or other alkali metal cyanides, in place of sodium cyanide.

I claim:

1. In the production of cyanogen chloride, the process which comprises treating with chlorine an alkali metal cyanide in the presence of an inert solvent, immiscible in water, and a small quantity of an alcohol of the aliphatic series as a catalyst.

2. In the production of cyanogen chloride, the process which comprises treating sodium cyanide with chlorine in the presence of carbon tetrachloride and of ethyl alcohol.

3. In the production of cyanogen chloride, the process which comprises treating sodium cyanide with chlorine in the presence of carbon tetrachloride and of an amount of ethyl alcohol equal to about 1% by weight of the weight of sodium cyanide employed.

4. In the production of a cyanogen chloride solution in carbon tetrachloride, the process which comprises treating sodium cyanide with chlorine in the presence of carbon tetrachloride and of an amount of ethyl alcohol equal to about 1% by weight of the sodium cyanide employed, the temperature during the treatment being maintained at around 0° C.

5. In the production of cyanogen halide, the process which comprises treating with halogen a metal cyanide in the presence of an inert solvent and of a small amount of 95% ethyl alcohol as a catalyst.

6. In the production of cyanogen chloride, the process which comprises treating with chlorine an alkali metal cyanide in the presence of an inert solvent immiscible with water and a small quantity of 95% ethyl alcohol as a catalyst.

7. In the production of cyanogen chloride, the process which comprises treating sodium cyanide with chlorine in the presence of an inert solvent having a boiling point of about 60–100° C. and of a small amount of 95% ethyl alcohol as a catalyst.

8. In the production of cyanogen chloride, the process which comprises treating sodium cyanide with chlorine in the presence of carbon tetrachloride and of an amount of 95% ethyl alcohol equal to ½ to 3% of the weight of the sodium cyanide at a temperature of $-10°$ to $+5°$ C.

9. In the production of cyanogen chloride, the process which comprises treating sodium cyanide with chlorine in the presence of an inert solvent and ethyl alcohol.

In testimony whereof I affix my signature.

JOHANN PAUL SCHMITTNÄGEL.